(12) United States Patent
Hara

(10) Patent No.: US 6,816,313 B2
(45) Date of Patent: Nov. 9, 2004

(54) DISPLAY UNIT, DISPLAY METHOD, AND DISPLAY INSTRUMENT EMPLOYING THE SAME

(75) Inventor: Koichi Hara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 69 days.

(21) Appl. No.: 10/021,087

(22) Filed: Dec. 19, 2001

(65) Prior Publication Data

US 2002/0089467 A1 Jul. 11, 2002

(30) Foreign Application Priority Data

Dec. 21, 2000 (JP) .......................... 2000/388452
Dec. 26, 2000 (JP) .......................... 2000/394925

(51) Int. Cl.⁷ .............................................. G02B 27/10
(52) U.S. Cl. .................. 359/626; 359/621; 359/619
(58) Field of Search ................................ 359/619, 621, 359/622, 623, 626

(56) References Cited

U.S. PATENT DOCUMENTS

| | | | |
|---|---|---|---|
| 5,379,132 A | 1/1995 | Kuwayama et al. | |
| 5,499,138 A | 3/1996 | Iba | |
| 5,561,538 A | * 10/1996 | Kato et al. | ...................... 349/5 |
| 5,748,375 A | * 5/1998 | Yamana | ...................... 359/622 |
| 5,751,383 A | * 5/1998 | Yamanaka | ................... 349/13 |
| 5,883,606 A | * 3/1999 | Smoot | ........................... 345/7 |
| 5,971,547 A | * 10/1999 | Reilley | ....................... 353/122 |
| 6,061,179 A | 5/2000 | Inoguchi et al. | |
| 6,407,724 B2 | 6/2002 | Waldern et al. | |
| 2001/0054988 A1 | 12/2001 | Cone et al. | |
| 2002/0075566 A1 | 6/2002 | Tutt et al. | |
| 2002/0089467 A1 | 7/2002 | Hara | |

FOREIGN PATENT DOCUMENTS

| | | |
|---|---|---|
| JP | 05-328261 | 12/1993 |
| JP | 06-043391 | 2/1994 |
| JP | 06-82934 | 3/1994 |
| JP | 10-170860 | 6/1998 |

* cited by examiner

Primary Examiner—Ricky Mack
(74) Attorney, Agent, or Firm—Fitzpatrick, Cella, Harper & Scinto

(57) ABSTRACT

A display unit is provided which enables monocular observation of a magnified displayed image, and binocular observation of a non-magnified displayed image. The display unit comprises a liquid crystal display element having pixels arranged two-dimensionally, and a backlight source for illuminating the liquid crystal display element from the backside. The backlight source comprises a micro-spotlight illumination system constituted of a surface light source, a barrier element, and a microlenses. The barrier element is controlled to take a complete transmission mode to transmit the light emitted form the surface light source or an aperture-formation mode to form apertures in matrix arrangement. In the aperture formation mode, the microlenses are focused substantially on the apertures respectively. The apertures, the microlenses corresponding thereto, and the pixels corresponding thereto are arranged such that the optical axes of the respective micro-spotlight illumination system pass through the pixels of the corresponding liquid crystal display elements from the backside and come to intercross roughly at one point on a pupil of an eye E brought close to the display face of the liquid crystal display element at a short distance not focusable physiologically.

13 Claims, 12 Drawing Sheets

DISPLAY UNIT, DISPLAY METHOD, AND DISPLAY INSTRUMENT EMPLOYING THE SAME

BACKGROUND OF THE INVENTION

1. Field of the Invention

The present invention relates to a display unit which enables observation of a magnified image by one eye. The present invention relates also to a display unit which enables switching between image magnification modes: a non-magnification mode for observation of an image with two eyes (binocular observation) at a distance longer than the distinct vision distance, and a magnification mode for observation of the image with one eye (monocular observation) at a distance shorter than the near point of vision.

2. Related Background Art

Head mount displays (hereinafter referred to as "HMD") are used for observation of a magnified image with one eye. However, such a display requires a large optical space for the image magnification for observation, and are not useful for non-magnified image observation with both eyes from a usual long distance. FIG. 1 shows a display unit disclosed in Japanese Patent Application Laid-Open No. 10-170860. This apparatus has a smaller optical space. In FIG. 1, the numerals and the symbols denote the following: 2, an ocular-side microlens array (pitch 70.8 μm); 3, a transmission-type liquid crystal display element (pitch 76.3 μm); 41, a light-condensing microlens array (pitch 81.8 μm); 42, a light-parallelizing microlens array (pitch 90 μm); 5, a flat backlight; 8, a diffusion hole sheet having apertures 9 serving as fine light spots (pitch 98.2 μm); E, an eyeball of an observer; and O, the pupil of the eyeball. In FIG. 1, microlenses R and S correspond to pixels P and Q, respectively. In FIG. 1, the dimensions of the parts of the display unit are as follows: A=18.85 mm, B=20.3 mm, C21.77 mm, F23.95 mm, G26.13 mm, H=3 mm, D=3 mm, J=2 mm, K=2 mm, and M=25.9 mm. This display unit has an ocular optical system including microlenses for introducing the light beams emitted from the respective pixels. This display unit is provided to increase the light efficiency as the HMD by decreasing the thickness, but is not suitable at all for observation of an image with both eyes from a distant position. Specifically, as shown in FIG. 1, with the unit in which microlenses 2 are placed at the front side of liquid display element 3, when the image is observed with both eyes from a distant position, the visual axes of the both eyes intersect each other by convergence at the display element face (display face). However, the virtual image is formed apart from the element face by lens action of the microlenses 2. Therefore, the observed image is doubled. Accordingly, the displayed image cannot be observed in a favorable state from a position distant from the display face. Moreover, the microlenses are decentered from the pixels, which may cause cross-talk owing to the light from the adjacent aperture to lower the image quality. Further, Moire may be caused between the boundary of the microlenses and the boundary of the pixels of the display elements to lower the picture image quality.

FIG. 2 shows a display unit disclosed in U.S. Pat. No. 5,499,138. In FIG. 2, E denotes an eyeball; the numeral 81 denotes a field lens; 82, microlenses; and 83, an image displaying device. This display unit, which is capable of displaying an image compactly with high resolution as an HMD, does not enable observation from a distant position owing to the employed field lens. Even if the field lens is made detachable, Moire can be caused between the boundary of the microlenses and the boundary of the pixels owing to the arrangement of the microlenses as a part of the ocular optical system on the front side of the display elements, which makes the unit not suitable for binocular observation from a distant position.

SUMMARY OF THE INVENTION

As described above, the inventors of the present invention noticed the problem that conventional observation means for observing a magnified virtual image cannot be suitable for image observation from a distant point.

The present invention intends to provide a display unit which enables magnified image observation with one eye from a short distance, and which can be reduced in weight and thickness thereof. The present invention intends also to provide a display unit which enables magnified image observation with one eye at a short distance as well as non-magnified image observation with two eyes from a long distance.

The present invention provides a display unit comprising image displaying means having pixels arranged two-dimensionally, plate-shaped illumination means having fine light-emitting points arranged two-dimensionally corresponding to the pixels of the image displaying means and being placed on the backside of the image displaying means, and fine optical elements for introducing light emitted from the fine light-emitting points arranged two-dimensionally corresponding to the pixels of the image displaying means to the respective pixels. The pixels and the fine optical element and the fine light-emitting point corresponding to the pixels are arranged so that optical axes (the light beams passing through the respective optical centers) connecting the respective fine light-emitting points and the respective fine optical elements corresponding thereto pass through the pixels corresponding to the fine optical elements and the fine light-emitting points and intercross (intersect) substantially at a prescribed point within a distance of near point of vision of an eye from the display face of the image display means. Also, the fine optical elements form a virtual image of the fine light-emitting points corresponding thereto at a distance longer than a distinct vision distance of the eye from the prescribed point. The average eye has the near point of vision of 80 to 100 mm and the distinct vision distance of 250 mm. Therefore, in a general-purpose display, the distance between the aforementioned display face and the prescribed position is set at about 5 to 50 mm, and the distance between the prescribed position and the virtual image of the fine light-emitting point is set in the range from 250 mm to infinity, preferably at about 1 to 5 m.

A conventional display unit for observation of a magnified virtual image like the aforementioned HMD has an ocular optical system on an observer side of the display face for the virtual image observation. The display unit of the present invention has fine optical elements and fine light-emitting points on the back side of the image displaying means to observe the magnified virtual images of the fine light-emitting points magnified by the fine optical elements through the image display means. In other words, the magnified virtual image of the fine light-emitting points is observed by employing the arrangement plane of the fine light-emitting points as the object plane. Thus, the present invention is based on an idea different in principle from the display units of the prior art. The display unit of the present invention does not employ the ocular optical system for forming a magnified virtual image, in order to enable reduction of the thickness and weight of the display unit.

In another embodiment of the display unit of the present invention, the plate-shaped illumination means is constituted of a surface light source, and a barrier means which switches the light transmission mode to a aperture mode in which the light of the surface light source through apertures arranged two-dimensionally corresponding to the pixels, or to an entire transmission mode.

In the aperture mode in which the light of the surface light source is allowed to pass through the apertures, the constitution is the same as the display unit of the first embodiment: the magnified image is displayed for observation from a position at a shorter distance than the near vision point from the display plane. On the other hand, in the entire transmission mode in which the barrier means allows the light of the surface light source through the entire face, the entire plane of the image display elements is illuminated to cancel the formation of the virtual image of the fine optical elements and to allow observation of the non-magnified object from a position in a distance longer than the distinct vision distance.

The present invention provides a reflecting display unit which enables monocular observation of a magnified image from a short distance as well as binocular observation of a non-magnified image from a long distance.

According to an aspect of the present invention, there is provided a display unit comprising image displaying means having pixels arranged two-dimensionally, plate-shaped illumination means having fine light-emitting points arranged two-dimensionally corresponding to the pixels and being placed on the backside of the image displaying means, and fine optical elements for introducing light emitted from the fine light-emitting points arranged two-dimensionally corresponding to the pixels, to the respective pixels. The pixels, and the fine optical elements and the fine light-emitting points corresponding to the pixels are arranged so that optical axes connecting the respective fine light-emitting points and the respective fine optical elements corresponding thereto pass through the pixels corresponding to the fine optical elements and the fine light-emitting points and the optical axes intercross (intersect) substantially at a prescribed point within a distance of a near point of vision of an eye from a display face of the image display means. Further, the fine optical elements form a virtual image of the fine light-emitting points corresponding thereto at a distance longer than a distinct vision distance of the eye from the prescribed point.

The above plate-shaped illumination means may comprise a surface light source, and a barrier means having apertures arranged two-dimensionally corresponding to the pixels and serving as the fine light-emitting points by transmitting the light from the surface light source.

The above barrier means may be capable of taking an aperture formation mode to allow the light of the surface light source to pass through the apertures, or an entire transmission mode, by switching.

According to another aspect of the present invention, there is provided a display method, employing the aforementioned display unit. The method enables monocular observation of magnified displayed information from the prescribed point or vicinity thereof by switching the barrier means to the aperture formation mode to allow the light of the surface light source to pass the apertures. The method also enables binocular observation of non-magnified information from a distance longer than distinct vision distance from the display face of the image display means by switching the barrier means to the entire transmission mode.

According to still another aspect of the present invention, there is provided a display instrument, employing the aforementioned display method.

According to a further aspect of the present invention, there is provided a display unit comprising a reflecting-type display element having a reflection face having pixels and apertures corresponding to the pixels for transmitting light beams, a surface light source placed on the back face of the display element, and microlenses arranged two-dimensionally in front of a display face of the display element corresponding to the pixels. The microlenses, the pixels and apertures corresponding respectively to the microlenses are arranged such that the optical axes connecting the corresponding microlens, pixel, and aperture inter-cross (intersect) at substantially one point at a magnified image observation position at a distance shorter than the near point of vision in the opposite side of the display element relative to the two-dimensionally arranged microlenses. Also, the microlenses form a magnified virtual image of the corresponding apertures at a distance longer than the distinct vision distance.

According to a further aspect of the present invention, there is provided a display method, employing the aforementioned display unit, which displays a magnified image by turning-on of the surface light source to be observed monocularly at or near the observation position, and displays a non-magnified image by turning off the surface light source to be observed at a position from a distance not shorter than distinct vision distance from the display face.

According to a further aspect of the present invention, there is provided a display instrument, employing the aforementioned display unit.

For achieving the above objects, the present invention provides a display unit which comprises reflecting display elements, apertures on the reflecting face of the display elements for transmitting light beams in correspondence with the pixels on the display elements, a surface light source placed on the back side of the display elements, and microlenses in front of the display face of the display elements in correspondence with the pixels. The pixels of the display element are arranged in two dimensions. Therefore, the apertures and the microlenses are arranged similarly in two dimensions. The microlenses, the pixels and apertures corresponding respectively to the microlenses are arranged such that the optical axes connecting the corresponding microlens and aperture intercross roughly at one point at the magnified image observation position at a distance shorter than the near point of vision on the side opposite to the display elements relative to the two-dimensionally arranged microlenses, and that the microlenses form a magnified virtual image of the corresponding apertures at a distance longer than the distinct vision distance.

The average eye has the near point of vision of 80 to 100 mm and the distinct vision distance of 250 mm. Therefore, in a general-purpose display unit, the distance between the microlenses and the magnified-image observation position is set at about 5 to 50 mm, the distance between the magnified-image observation position and the virtual image of the apertures is set in the range from 250 mm to infinity, preferably at about 1 to 5 m.

With the display unit of the present invention, the observer can observe a magnified virtual image of the apertures by peeping into the display face by bringing his pupil at or near the magnified image observation position on lighting of the surface light source; and the observer can observe the real-size of the displayed image on light-out of the surface light source from the observation position at a distance longer than the distinct vision distance. In this display unit, the microlenses are placed on the observation side of the display face, which is different from a usual reflecting display unit for real-size observation. However, the adverse effect of the microlens in the non-magnified image observation can be made negligible by adjusting the distance between the microlenses and the pixels sufficiently shorter than the distance between the microlenses and the apertures to bring the image magnification of the microlenses near to 1.

The present invention provides also a display unit which enables observation of a magnified virtual image of the pixel portion by peeping the pixels with one eye, having the pixel portion near the observer, the light source distant from the observer, and the magnifying optical system between the one eye of the observer and the light source to enable the observation of a non-magnified image of the pixels by looking at the pixel portion with two eyes.

Figure 1:
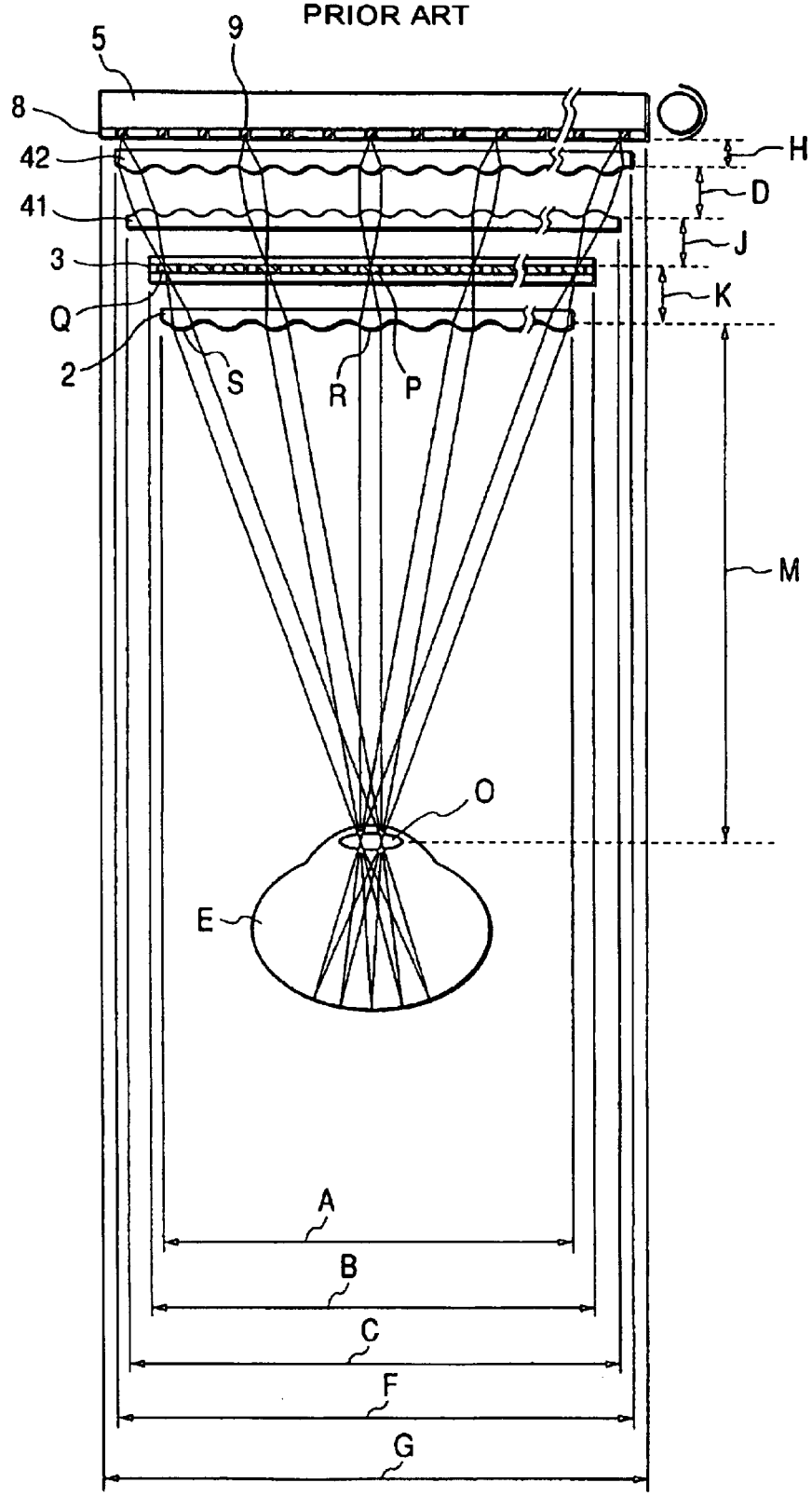
FIG. 1 illustrates an ocular optical system having microlenses for introducing the light emitted from the pixels for an HMD.
Figure 2:
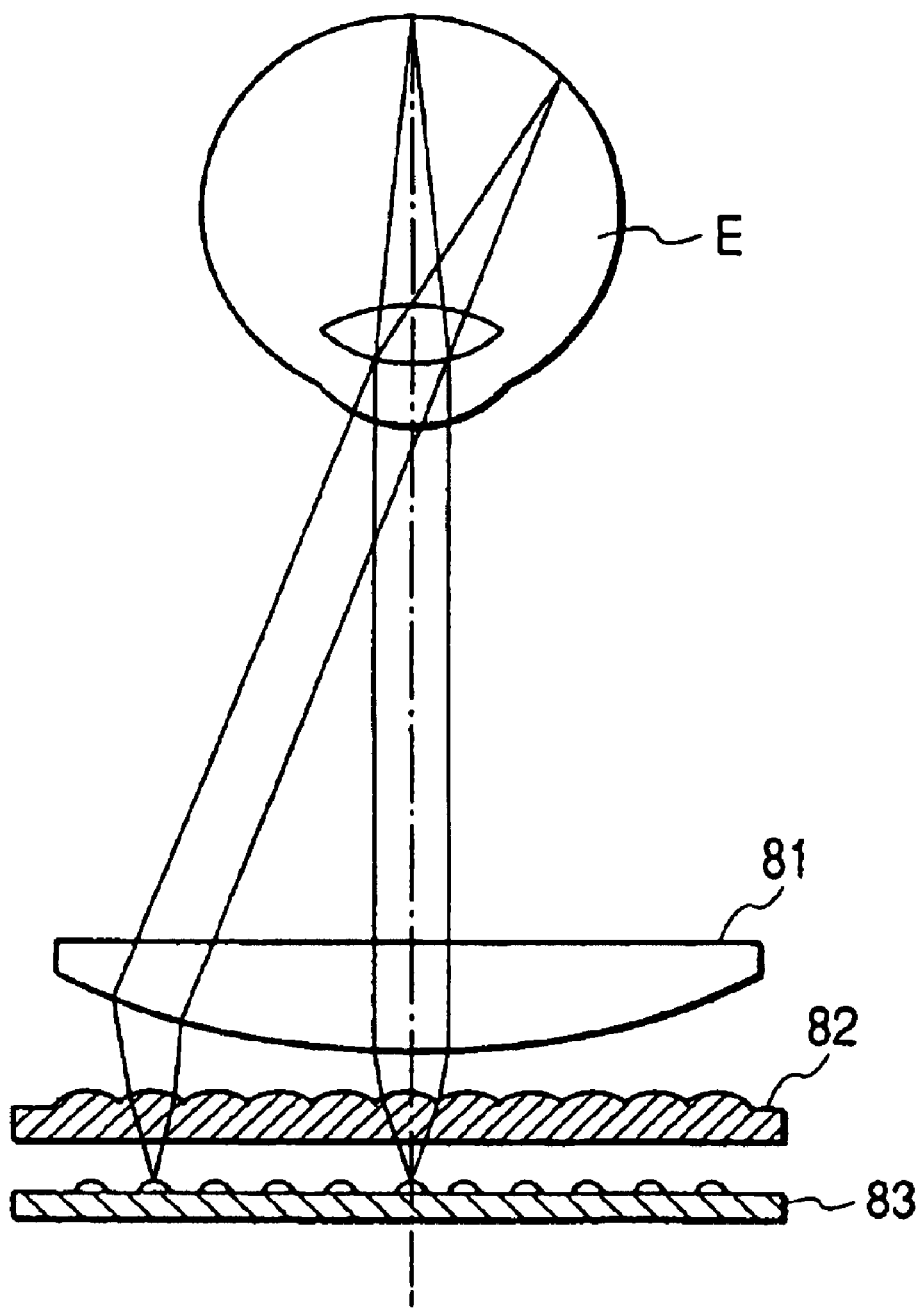
FIG. 2 shows use of a field lens for an HMD.

DESCRIPTION OF THE PREFERRED EMBODIMENTS (First Embodiment)

The present invention provides a display unit which enables observation of a magnified virtual image of a pixel portion by peeping the pixels with one eye, having the pixel portion near the observer, the light source distant from the observer, and the magnifying optical system between the one eye of the observer and the light source to enable observation of a non-magnified image of the pixels by looking at the pixel portion with two eyes.

In the present invention, the pixel portion signifies the portion which has plural pixels, as the constitutional elements for displaying an image, arranged in two dimensions in a plane. An example of one pixel is a liquid crystal element which serves as a light valve to transmit and intercept light.

The region of pixel portion signifies a region in this plane which is effective for displaying the image.

In peeping the pixel portion with one eye, the pixel portion is brought close to the eye, too close for the eye to observe clearly the pixel portion itself. In this state, the light is introduced to the eye from the light source placed at the backside of the pixel portion through the pixels and the magnifying optical system. (The front side herein signifies the observer's eye side.) Thereby, the one eye observes the virtual magnified image of the pixel regions.

On the other hand, with the display unit of this embodiment, when the image portion is looked at with the both eyes at a position sufficiently distant from the image portion, the image of the pixel portion can be observed in a non-magnified size.

More specifically, a means other than the pixels of the pixel portion is provided between the light source and the magnifying optical system. The means is exemplified by a barrier element which is capable of transmitting and intercepting the light. For example, for displaying the image of the pixel portion without magnification, the additional element is made entirely transmissive to transfer the light through the entire face. Thereby the non-magnified display can be achieved.

In another example, reflecting liquid crystal elements are used which have a reflection face in the imaging portion. With this type of display unit, a magnified image can be observed by magnifying the light from the light source by means of a magnifying optical system, and non-magnified image can be observed by reflected outside light at the reflection face without illumination by the light source. Specific example are described later as another embodiment.

With the display unit of this embodiment, the observer can observe a magnified image with one eye, and can observe non-magnified image of the pixel portion region with the same unit.

(Second Embodiment)

The display unit of a second embodiment of the present invention is constituted of a micro-spotlight illumination system comprising a surface light source, a barrier element controlled to select an entire light-transmission mode or a rectangular aperture-formation mode having fine rectangular apertures arranged in matrix, and microlenses (fine optical elements) focusing on the respective apertures. The display unit also includes transmission-type liquid crystal display elements illuminated from the backside by the micro-spotlight.

The optical axes of the micro-spot illumination light beams are respectively allowed to pass through the pixels from the backside to focus roughly at one point on the pupil surface of the one eye which is brought close in a distance too short for the eye to focus physiologically (shorter than the distance of the near point of vision). Therefor, the pixels respectively corresponding to the rectangular apertures and the corresponding pixels are arranged so as to condense the optical axes at one point on the pupil surface.

The virtual image of the aperture portion can be formed within an eye accommodation range (e.g., 250 mm to infinity) by focusing roughly the microlenses in the vicinity of the rectangular apertures. When the pupil is sufficiently near to the displayed image not to be capable of observing the surface of the picture image, the eye observes the virtual image, namely a magnified image.

The maximum incident angle of the micro-spotlight beam onto the pupil decides the size of the virtual image (displayed image), which depends on the distance from the displayed image to the pupil surface. The magnification ratio of the pixels by the microlenses, and the magnification ratio of the displayed image are independent on each other. However, the size of the apertures are decided not to cause overlap with the adjacent pixel images. For this purpose, the distance L between the pupil surface and the display face, the size D of the image screen, the focus length f of the microlenses, and the size W of the apertures are adjusted, when the distance between the pupil surface and the virtual image plane is sufficiently large, to satisfy the relation:

$$W \leq f \times D/L$$

In observation of the image with two eyes from a distant position, the barrier elements are switched to an entire transmission mode to cancel the micro-spotlight function and to illuminate the liquid display elements from the backside nearly uniformly.

Thus, in this embodiment, in observation of the small display panel screen, the barrier elements are switched to change the back illumination mode to the micro-spotlight illumination mode or to the entire uniform illumination mode. For peeping the image with one eye from a short distance, the mode is switched to the micro-spotlight illumination mode to enable observation of magnified virtual image of the rectangular apertures, whereas for binocular observation of the non-magnified display from a long distance, the mode is switched to the entire uniform illumination mode to enable observation without occurrence of Moire between the microlenses and the pixels of the display elements and without causing crosstalk and convergence in the two-eye observation. With the above displaying unit, a small screen of a pocket telephone or the like can be observed with image magnification.

The microlens may be constituted of a refractivity-variable flat element plate in this embodiment. The refractivity-variable flat elements may be constituted of liquid-crystal panel elements. The barrier elements may also be constituted of a liquid crystal panel elements.

In the display unit, the illumination mode for monocular short-distance observation, and the illumination mode for binocular long-distance observation may be made selectable by clicking a hard-switch or a soft-switch provided outside the instrument for the kind of display, or selectable by detection of the approach of the face of the observer by a sensor. Thereby, the display mode can be switched to the magnified short-distance monocular observation mode or to the long-distance binocular observation mode.

Examples 1 to 5 for the second embodiment are described below. In the drawings, the same symbols are used commonly for the corresponding parts.

EXAMPLE 1

Figure 3:
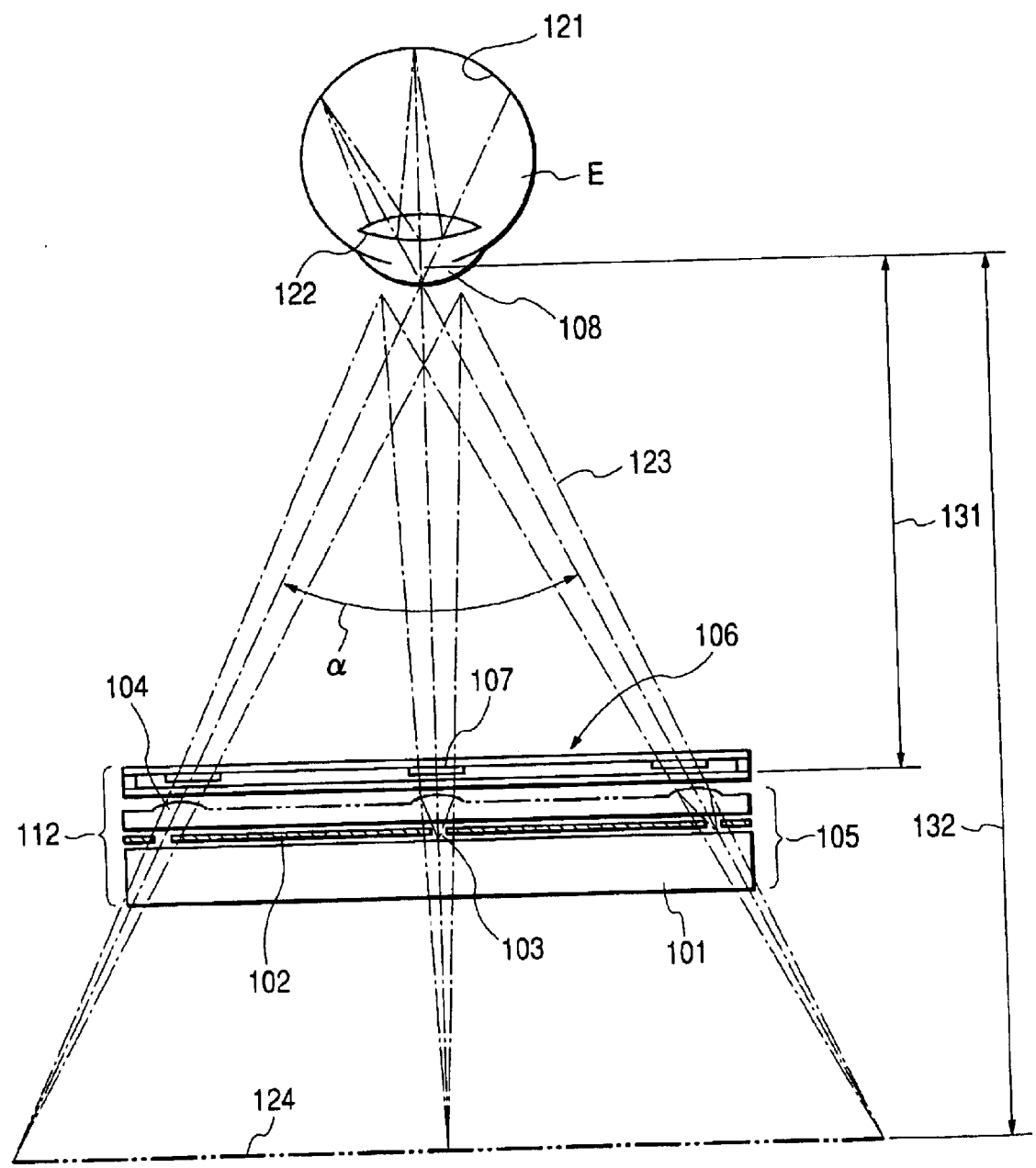
FIG. 3 shows the optical principle for magnified image observation in the display unit of Example 1 of the present invention.

FIG. 3 shows the optical principle for magnified image display in the display unit of Example 1 of the present invention. In FIG. 3, E indicates an eyeball; 121, a retina; 122, an eye lens; 101, a surface light source; 102, a barrier element which is controllable to switch between the entire transmission mode and the aperture formation mode; 103, a rectangular aperture of the barrier element 102 in the aperture-formation mode; and 104, a microlens. Microlens 104 is focused roughly on rectangular aperture 103. Microspotlight 105 is constituted of surface light source 101, the rectangular aperture 103 of barrier element 102 in the aperture-formation mode, and microlens 104. The numeral 106 indicates a transmission-type display element; 107, a pixel of the transmission-type display element; and 108, a pupil face of eye E. Display unit 112 is constituted of micro-spotlights 105 and transmission-type display elements 106. The numeral 124 indicates the position of the virtual image. In FIG. 3, distance 131 ranges from 10 to 20 mm, and distance 132 ranges from 250 mm to infinity.

In the aperture-formation mode of barrier element 102, the respective light beams 123 emitted from the respective micro-spotlight 105 (the light beams having passed through rectangular aperture 103 and microlens 104) are projected to the transmission-type display element 106 from the backside, and the light fluxes having passed through pixels 107 are introduced from transmission-type display element 106 to pupil 108 of one eye E brought to a position nearer than the physiologically focusable limit distance (shorter than the near point of vision: e.g., 10 to 20 mm).

In this Example, the angle α of the light flux from the outermost pixel of display element 106 decides the magnified size of the display element 106. In this Example, α=30° (diagonal screen angle).

The virtual image of rectangular apertures 103 magnified by microlenses 104 should be formed at a distance longer than the distinct vision distance from the pupil surface 108. In this example, the distance is 2.8 m, which corresponds to observation of 59-inch screen at a distance of 2.8 m from the screen.

The distance L between the display face of the transmission-type display element 106 and pupil surface 108, the size D of the display face of the transmission-type display element 106, the focus length f of the microlenses, and the size W of the rectangular aperture 103 are adjusted to satisfy the relation: $W \leq f \times D/L$, thereby preventing overlap of the virtual images of the adjacent pixels 107.

EXAMPLE 2

Figure 4:
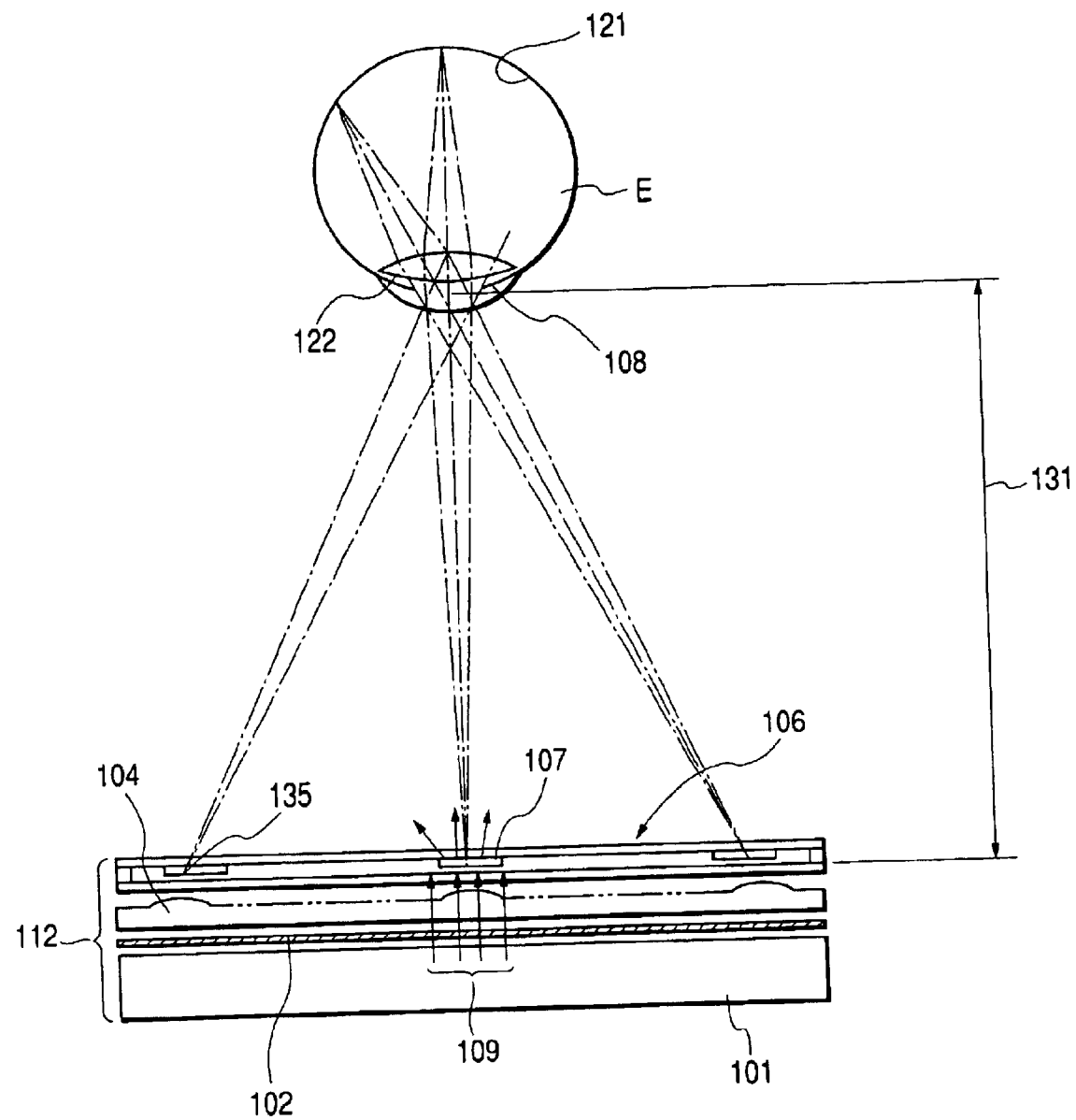
FIG. 4 shows the optical principle for non-magnified image observation in the display unit of Example 2 of the present invention.

FIG. 4 shows the optical principle for non-magnified image display in the display unit having the same constitution as that in Example 1. In this Example, barrier element 102 is switched to the entire transmission mode for binocular observation of non-magnified image formed on the display face of transmission-type display element 106 at a distance longer than the distinct vision distance. The distance 131 ranges 250 to 300 mm. The numeral 135 indicates the focusing position explained later.

In FIG. 4, light 109 emitted from surface light source 101 passes through microlenses 104 which has the micro-spotlight function canceled, and illuminates nearly uniformly the transmission-type display element 106 from the backside. Thereby, the entire image on display element 106 could be observed binocularly from a distant position in an eye accommodation range.

EXAMPLE 3

Figure 5:
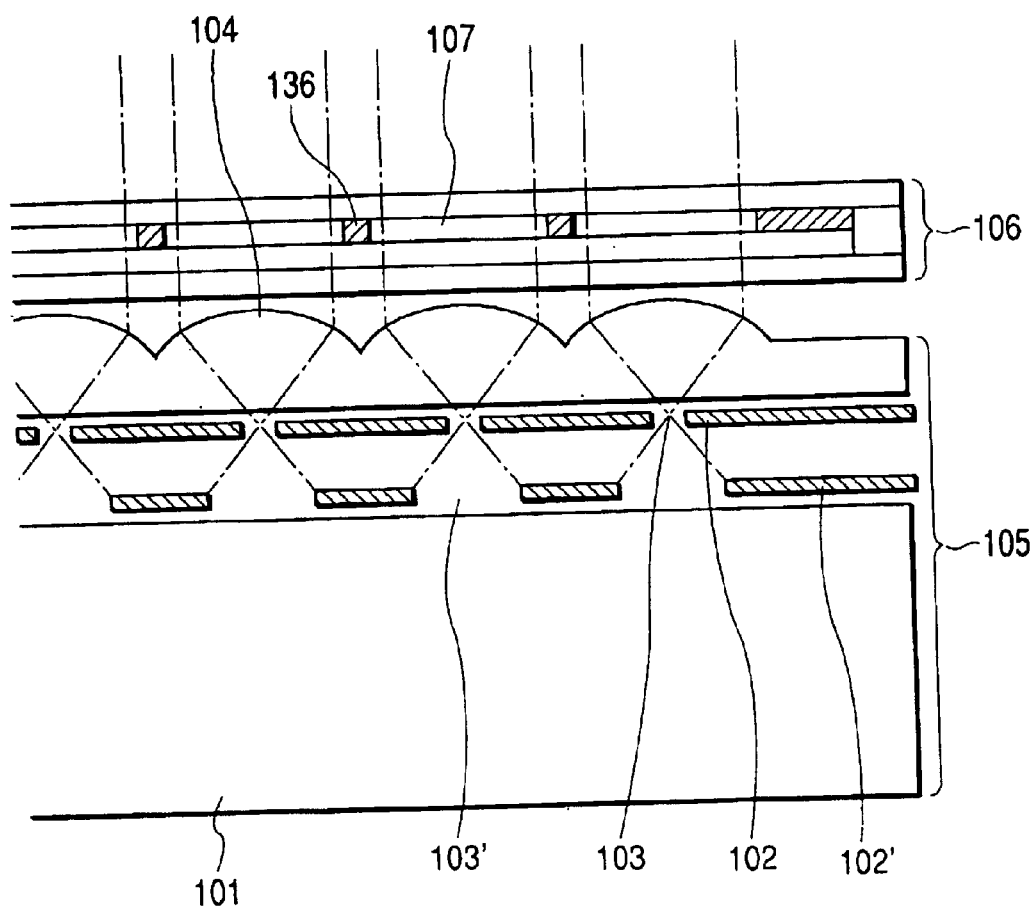
FIG. 5 shows use of two barrier elements in Example 3 of the present invention.

FIG. 5 shows the constitution of a display unit of Example 3. In this Example, two barrier elements are used. With the one barrier element, divergent light from aperture 103 can enter the adjacent microlens 104 to cause crosstalk. The divergent light is useless and lowers the image quality. Therefore, the divergent light is decreased by providing additionally a second barrier element 102' for forming an auxiliary aperture 103'. The two barrier elements 102, 102' are switched simultaneously to the aperture-formation mode or to the entire transmission mode. The numeral 136 indicates a black matrix.

EXAMPLE 4

Figure 6:
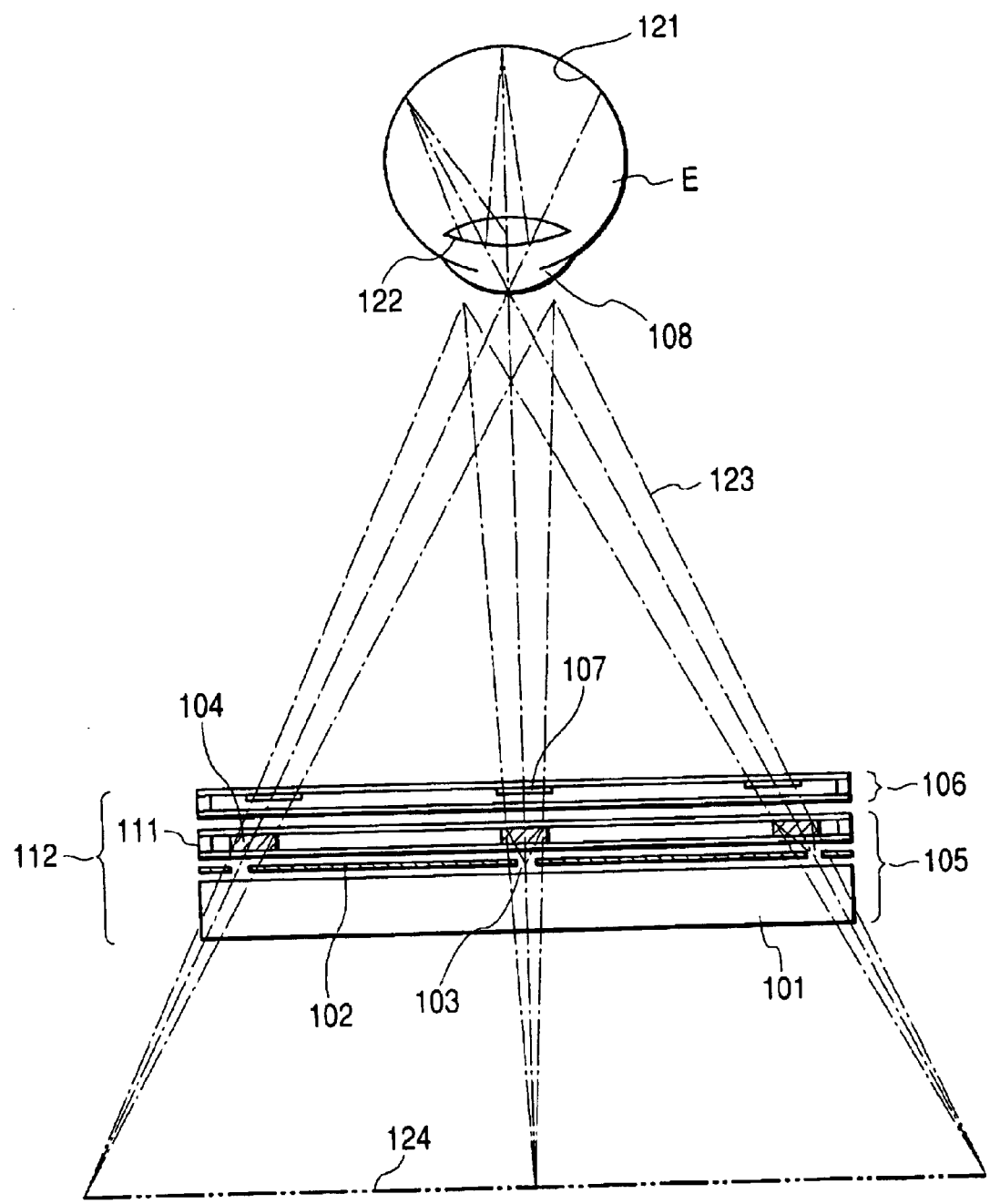
FIG. 6 shows use of a refractivity-controllable type of microlens plate in Example 4 of the present invention.

FIG. 6 shows the optical principle of display magnification in the display unit of Example 4 of the present invention. In this example, a refractivity-variable plate-shaped element 111 is employed as the microlenses. The liquid-crystal-type plate-shaped element 111 is switchable by voltage application to a microlens mode or to a non-refraction mode. Completely uniform backlight can be realized by combining plate-shaped element 111 in the non-refraction mode and barrier element 102 in a entire transmission mode.

EXAMPLE 5

Figure 7B:
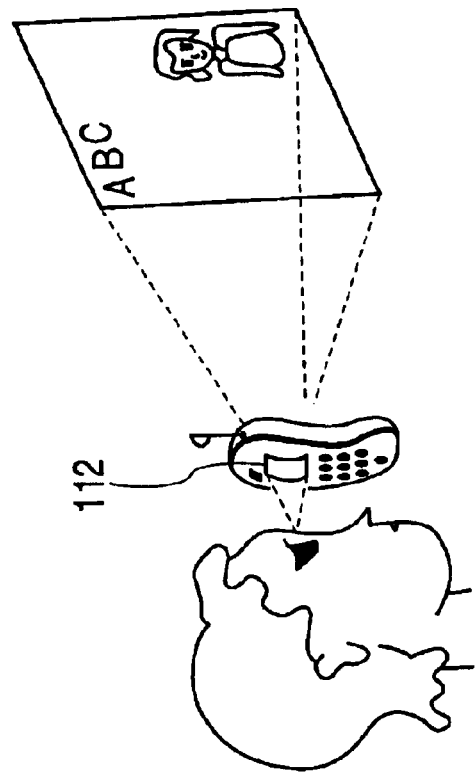
FIG. 7A and FIG. 7B illustrate a portable instrument of Example 5 employing a display unit of the present invention in the display face.
Figure 7A:
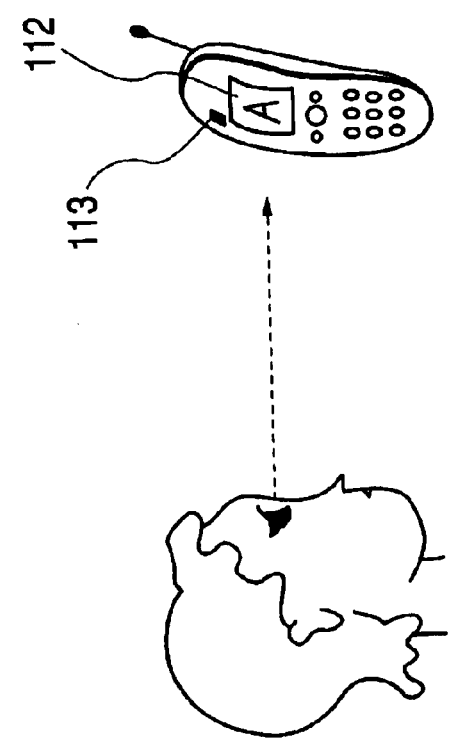

FIGS. 7A and 7B illustrate an example of a display unit 112 of the present invention employed in a portable instrument. FIG. 7A shows an observer looking binocularly at the display face from a long distance. FIG. 7B shows the observer looking monocularly at the magnified image by bringing the pupil near. In the state of FIG. 7B, sensor 113 detects the approach of the observer's face. Otherwise, the image display mode may be switched by clicking the content of display on a hard-switch or a soft-switch provided outside the element.

In FIG. 7A, a part of the image is observed binocularly, and in FIG. 7B, the entire of the image is observed monocularly. Conversely, the instrument may be designed such that the entire image can be observed binocularly, and a part of the image can be observed monocularly. Various modification can be made. For example, a menu is displayed in a binocular observation mode, and an item selected from the menu is displayed in detail in a monomolecular observation mode. In another modification, a page of an address book is displayed in the binocular observation mode, and a home page selected from the address book is displayed in the monocular observation mode. Otherwise, different kinds of images may be displayed in a binocular observation mode and in a monocular observation mode: for example, switching between a portrait orientation and a landscape orientation depending on the binocular observation mode or in the monocular observation mode.

In the second embodiment of the present invention as described above, the display unit for monocular magnified image observation at a short distance can be improve for less weight and less thickness.

A displayed image on a small display element can be observed by switching the observation mode to a binocular observation mode without image magnification, or to a monocular observation mode for observation from a short distance with image magnification. In switching to the magnification observation mode, various changes of the image are possible: simple magnification of a small image, switching to a different kind of image, change of the display orientation, and so forth. With this display unit of the present invention, a larger amount of information which cannot be displayed in a small screen of pocket telephones or the like can be observed with magnification, which increases usefulness of portable instruments.

(Third Embodiment)

The display unit of a third embodiment of the present invention comprises a surface light source, a reflecting liquid crystal display having apertures for transmitting light beams to a reflection face, and microlenses respectively corresponding to the apertures, wherein optical axes connecting respectively the microlenses, the pixels of the reflecting liquid crystal display, and the apertures of the reflection face intersect roughly at one point at the position of a pupil of one eye of the observer brought close to the microlenses to enable the observer to observe monocularly a magnified virtual image of the apertures.

The lower substrate of the reflecting liquid display may be a transparent lower substrate or a reflective substrate as the lower substrate. With the transparent lower substrate, the reflection face of the reflecting liquid crystal display and the apertures are placed on the surface light source side of the transparent lower substrate, whereas with reflective substrate as the lower substrate, holes are formed as the apertures on the reflection face, and the holes are filled with a transparent thin film.

The reflecting liquid crystal display is a color display, in which the respective color filters of the pixels of the reflecting liquid crystal display are attached fairly closely onto the microlens side of the transparent upper substrate or onto the microlens surface.

The illumination mode is switchable for the monocular observation at a sort distance from the display unit or for the binocular observation at a long distance therefrom by clicking a hard-switch or a soft-switch provided outside the display unit, or by detecting the approach of the observer's face with a sensor.

With the above constitution, in monocular observation from a short distance, the magnified virtual image of the apertures can be formed in the eye accommodation range (250 mm to infinity) by focusing the microlenses roughly on the aperture on the reflective face of the reflecting liquid crystal display. The light fluxes emitted from the surface light source pass respectively through the aperture on the reflection face of the reflecting liquid display, through the pixel of the reflecting liquid crystal display, and through the microlenses successively, and is introduced to the pupil of the one eye.

The size of the virtual image (displayed image) of the entire display depends on width of the incident angle of the light flux emitted from the microlenses to the pupil. The magnification ratio of the apertures by the microlenses and the magnification ratio of the entire image by directivity of the light fluxes are independent each other, and no problem is caused insofar as the adjacent magnified virtual images of the apertures do not overlap.

In binocular observation from a long distance (200 to 300 mm), the surface light source is put off, and outside light is utilized. The outside light is reflected from the backside onto a color filter face attached fairy closely to cancel the magnification of the microlenses. The eye comes to focus on the color filter face without focusing on the inside magnified virtual image.

Thus, in the observation of an image on the reflecting small display panel screen, the image can be observed with image magnification by peeping with one eye from a short distance with the surface light source turned on, and without image magnification from a long distance with the both eyes with the surface light source pot off.

Examples 6 to 10 according to the third embodiment are described below.

EXAMPLE 6

Figure 8:
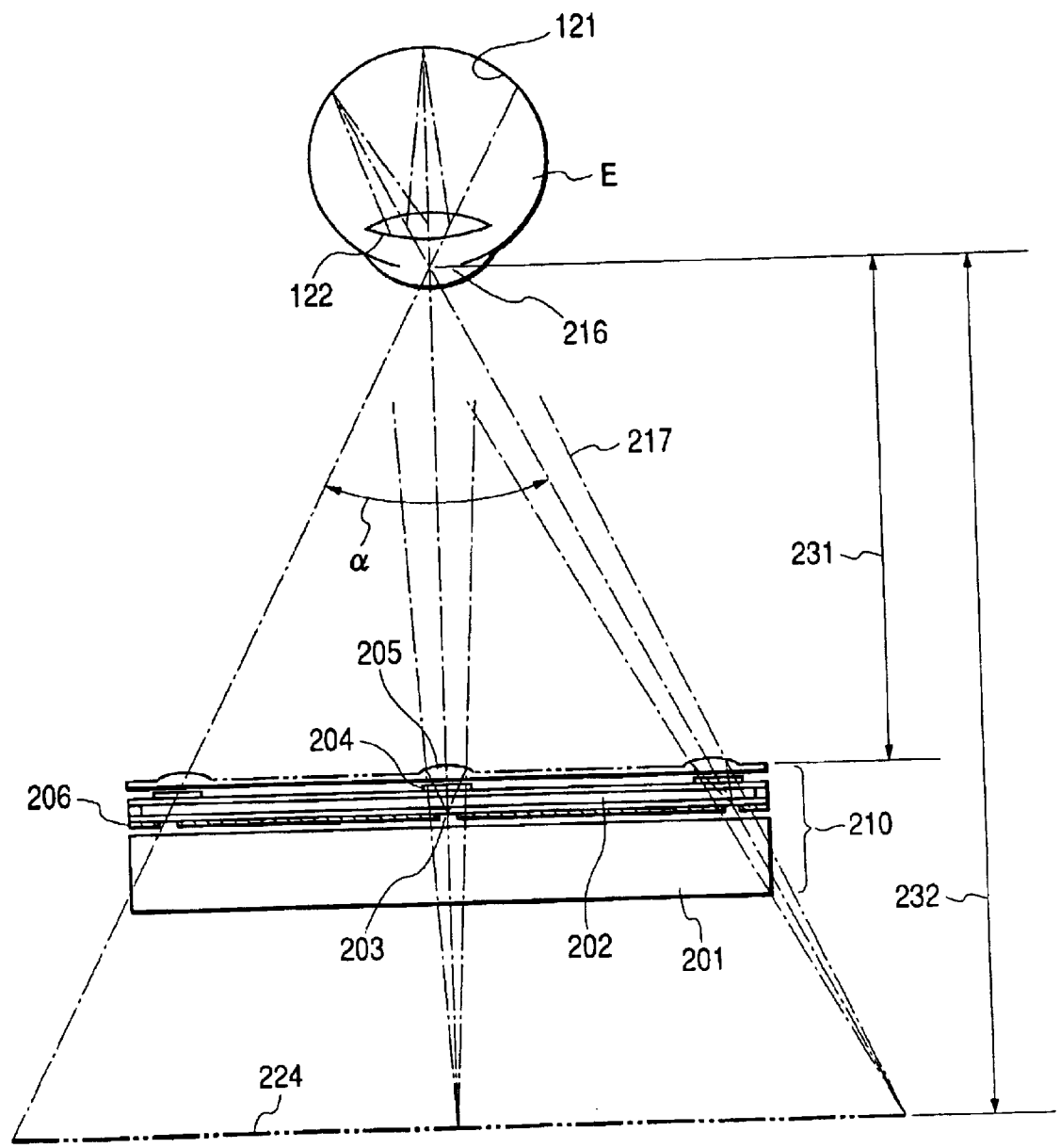
FIG. 8 shows the optical principle for magnified image observation in the display unit of Example 6 of the present invention.

FIG. 8 shows the optical principle for magnified image observation with the display unit of this Example 6 of the present invention. In FIG. 8, the numerals indicate the followings: 201, a surface light source; 202, a reflecting liquid crystal display; 203, an aperture formed in reflection face 206 of reflecting liquid crystal display 202; 204, a color filter of a pixel of reflecting liquid crystal 202; 205, a microlens; 210, a display unit; 216, a pupil of an eyeball; and 217, emitted light. Distance 231 ranges from 10 to 30 mm. Distance 232 ranges from 250 mm to infinity.

One aperture 203, one color filter 204, one microlens 205, and pupil 216 are arranged roughly in a straight line. Microlens 205 is focused on aperture 203 formed on reflection face 206 of reflecting liquid crystal display 202. When surface light source 201 is put on, the emitted light 217 therefrom passes through color filter 204, and is introduced to pupil 216 with directivity given by microlens 205. All of the light fluxes from the pixels are introduced to pupil 216 to enable observation of the entire of display unit 210.

In this Example, the angle $\alpha$ of the light fluxes from the pixels on the periphery of display unit 210 decides the magnified image size. In this example, $\alpha=30°$ (diagonal screen angle). Magnified virtual image 224 of the apertures 203 magnified by microlenses 205 should be formed at a distance longer than the distinct vision distance (250 mm for average eyes). The distance is set at 2.8 m in this example, which corresponds to observation of a 59-inch screen at a distance of 2.8 m from the screen.

When pupil 216 is brought to a position of 2 to 3 cm from display unit 210, the eye cannot physiologically focus on color filter face 204 of reflecting liquid crystal display 202, but focuses naturally on the magnified virtual image.

EXAMPLE 7

Figure 9:
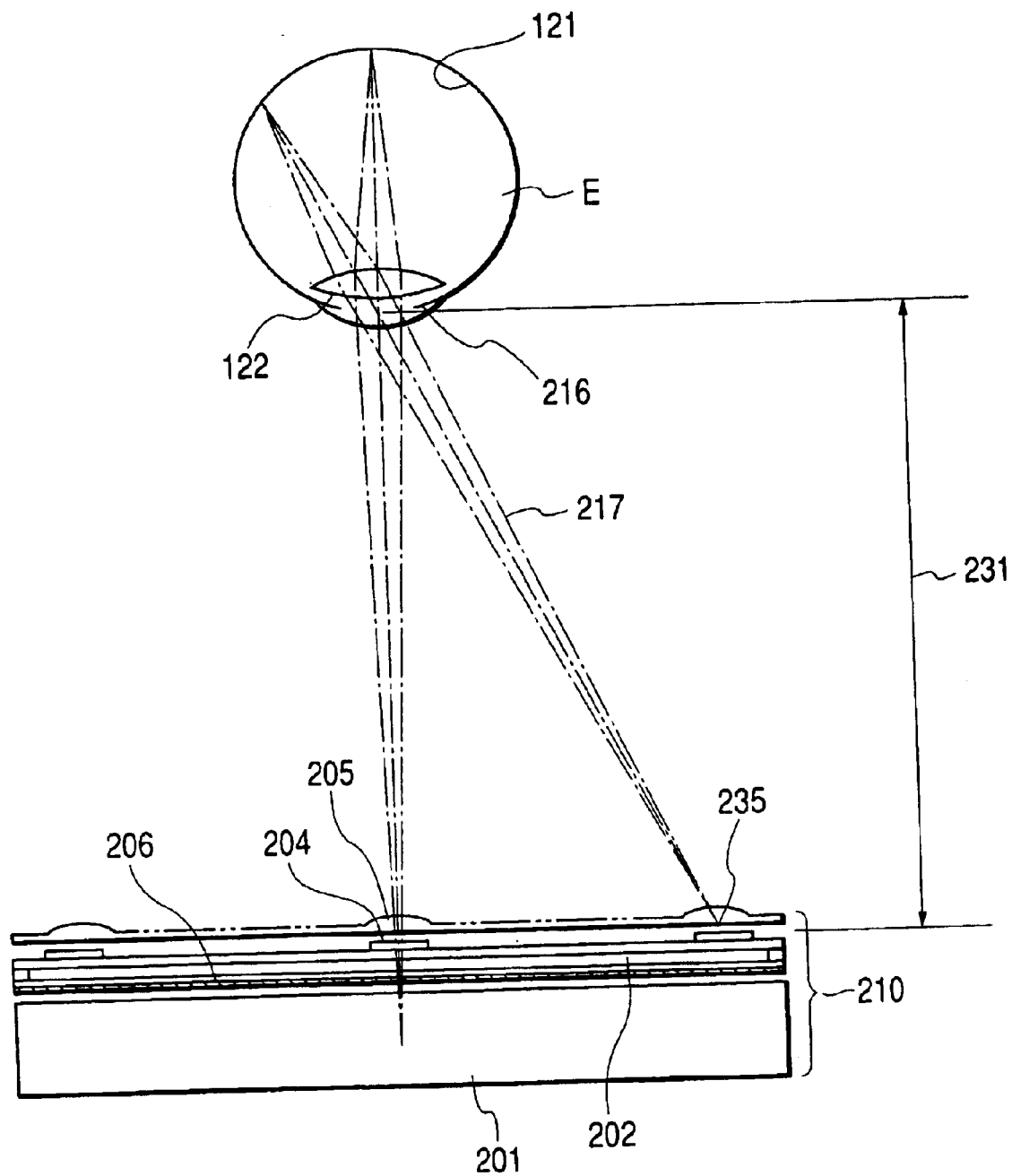
FIG. 9 shows the optical principle for non-magnified image observation in the display unit of Example 7 of the present invention.

FIG. 9 shows the optical principle for non-magnified image observation with a display unit having the same constitution as that of the above Example 6. In FIG. 9, the numerals indicate the followings: 201, a surface light source; 202, a reflecting liquid crystal display; 206, a reflection face of reflecting liquid crystal display 202; 204, a color filter of a pixel of reflecting liquid crystal 202; 205, a microlens; 210, a display unit; 216, a pupil of an eyeball; 217, emitted light; 231, a distance of 250 to 300 mm; and 235, a focusing point described later.

With surface light source 201 turned off, color filter faces 204 of reflecting liquid display 202 can be observed through microlenses 205 by aid of outside light reflected by reflection face 206 of reflecting liquid crystal display 202. Since color filters 204 are in fairly close contact with microlenses 205, the entire image on display unit 210 can be observed binocularly in the real size from a long distance.

EXAMPLE 8

Figure 10:
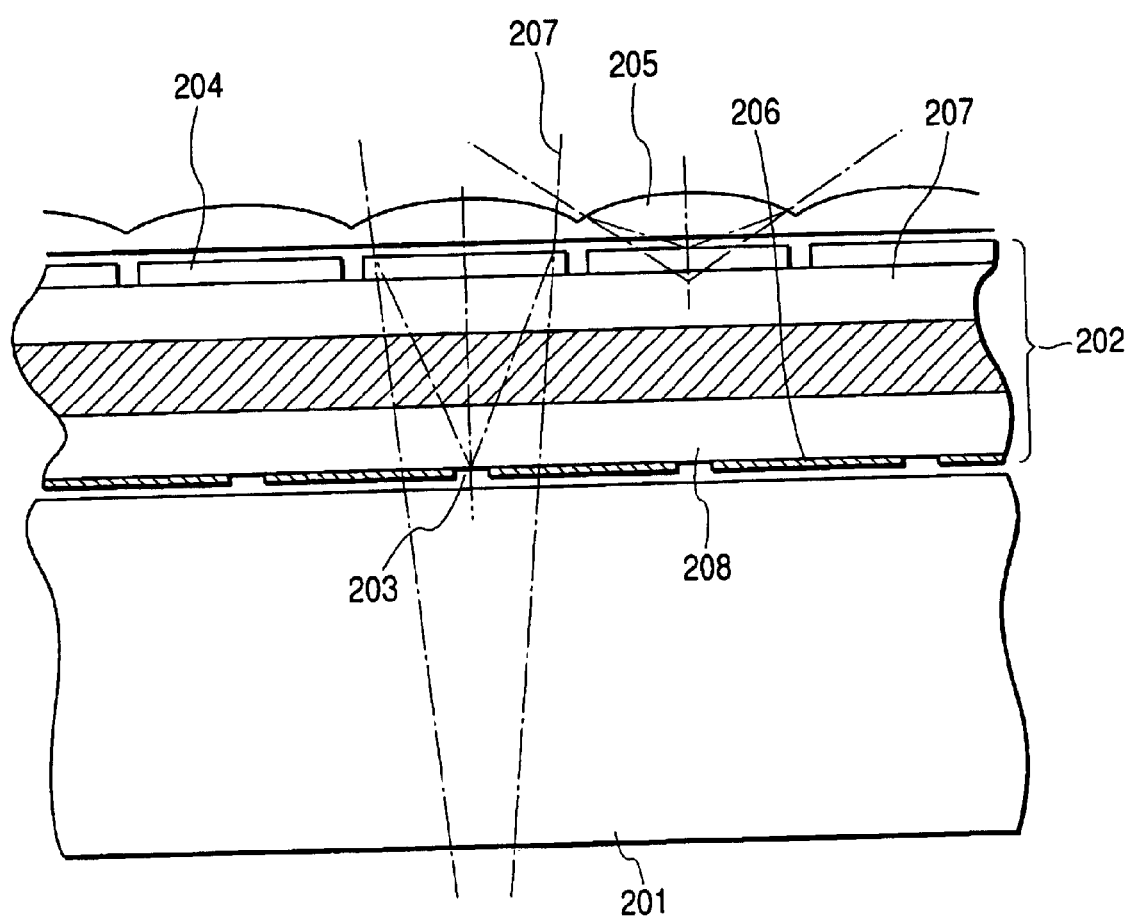
FIG. 10 shows a reflection face provided on the surface light source side of a light-transmissive lower substrate, and a color filter provided on the microlens side of the light-transmissive upper substrate in Example 8 of the present invention.

FIG. 10 shows a display unit of Example 8 of the present invention. In this Example, color filters 204 are formed in fairly close contact with microlenses 205. Color filters 204 are formed on the surface of transparent upper substrate 207 of reflecting liquid crystal display 202 to be nearly in close contact with microlenses 205. The close contact suppresses the magnification of microlenses 205 to enable real-size observation without convergence of the both eyes even in observation from a distant position.

A reflection face 206 is provided on the side of surface light source 201 of transparent lower substrate 208, and thereon apertures 203 are formed in order to separate apertures 203 from color filter face 204. Thereby, apertures 203 can be separated from color filter 204 by the thickness of transparent lower substrate 208. The larger the separation distance, the more easily can the focusing state of the eye on apertures 203 or on color filter face 204 be distinguished.

EXAMPLE 9

Figure 11:
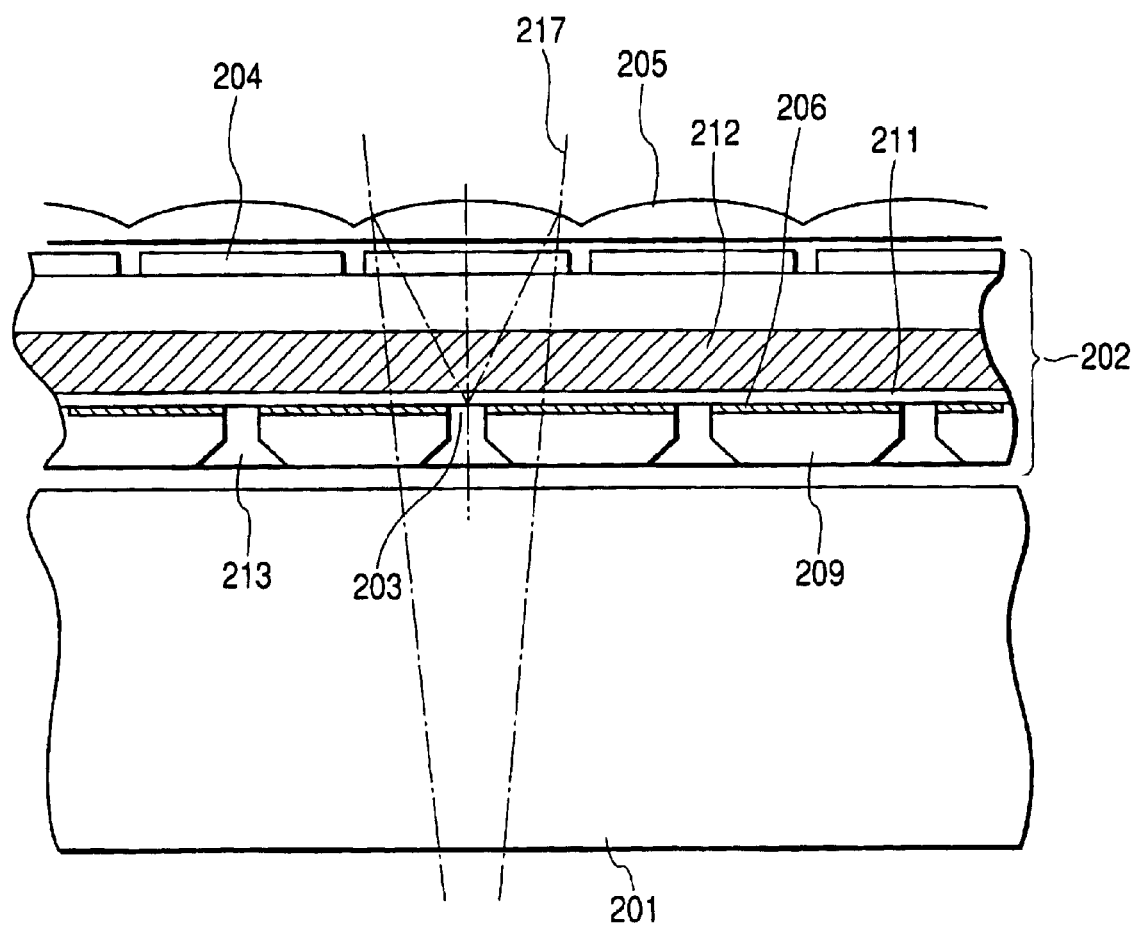
FIG. 11 shows apertures provided on a reflective substrate by boring holes in Example 9 of the present invention.

FIG. 11 shows constitution of the display unit of Example 9 of the present invention. In this Example, apertures 203 of reflecting liquid crystal display 202 are formed by boring through-holes 213 through reflecting substrate 209 (silicon substrate). To prevent leakage of liquid crystal substance 212, the through-holes are filled with transparent thin film 211.

EXAMPLE 10

Figure 12:
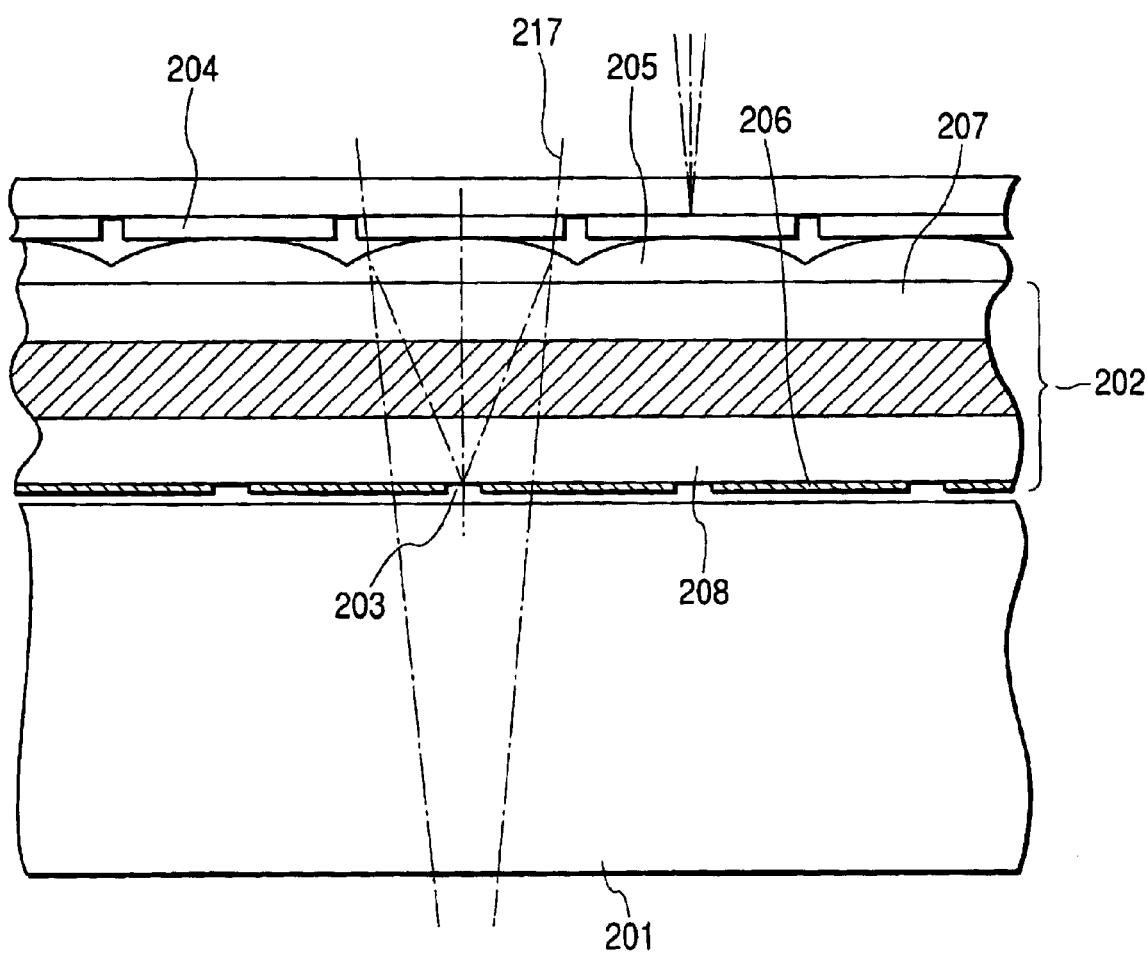
FIG. 12 shows color filters for constituting pixels on the upper faces of microlenses in Example 10 of the present invention.

FIG. 12 shows constitution of the display unit of Example 10 of the present invention. In this Example, color filters 204 are formed on the pupil side of microlenses 205. Thereby, color filters 204 are observed directly without influence of microlenses 205 in binocular image observation from a long distance.

EXAMPLE 11

FIGS. 7A and 7B shows example of portable instrument having a display face employing the display unit described in the third embodiment and Examples 6 to 10 of the present invention. FIG. 7A shows an observer looking binocularly at the display face from a long distance without image magnification. FIG. 7B shows the observer looking monocularly at the magnified image by bringing the pupil close to the display face. With approach of the face, sensor 114 turns on surface light source 201 (FIG. 8 to 12). With backward movement of the face, surface light source 201 is turned off. The turned-on state and the turned-off state may be selected by clicking a hard-switch or a soft-switch provided outside the element for the display content.

In FIG. 7A, a part of the image is observed with the both eyes, and in FIG. 7B, the entire of the image is observed monocularly. Conversely, the instrument may be designed such that the entire image can be observed binocularly, and a part of the image can be observed monocularly. Various modification can be made. For example, a menu is displayed in a binocular observation state, and an item selected from the menu is displayed in detail in a monocular observation state. In another modification, a page of an address book is displayed in the binocular observation state, and a home page selected from the address book is displayed in the monocular observation state. Otherwise, different images may be displayed in the binocular observation state and in the monocular observation state: for example, switching to a portrait orientation or to a landscape orientation in the binocular observation or in the monocular observation.

According to the present invention as described above, the displayed image of a small-sized display unit can be switched to a binocular real-size observation mode or to a monocular short-distance magnifying observation mode. Thereby a larger amount of information can be observed with magnification, which cannot be achieved by a small screen of conventional portable instruments or the like.

What is claimed is:

1. A display unit comprising image displaying means having pixels arranged two-dimensionally, plate-shaped illumination means having fine light-emitting points arranged two-dimensionally corresponding to the pixels and being placed on the backside of the image displaying means, and fine optical elements for introducing light emitted from the fine light-emitting points, which are arranged two-dimensionally corresponding to the pixels, to the respective pixels, wherein the pixels, the fine optical elements and the fine light-emitting points are arranged so that optical axes connecting the respective fine light-emitting points and the respective fine optical elements corresponding thereto pass through respective pixels corresponding to the fine optical elements and the fine light-emitting points, and the optical axes intersect substantially at a prescribed point within a distance of a near point of vision of an eye from a display face of the image display means, and the fine optical elements form a virtual image of the fine light-emitting points corresponding thereto at a distance longer than a distinct vision distance of the eye from the prescribed point.

2. The display unit according to claim 1, wherein a fine optical element is constituted of a refractivity-variable plate-shaped element.

3. The display unit according to claim 2, wherein the plate-shaped element is a liquid crystal panel element.

4. The display unit according to claim 1, wherein the plate-shaped illumination means comprises a surface light source, and a barrier means having apertures arranged two-dimensionally corresponding to the pixels and serving as the fine light-emitting points by transmitting the light from the surface light source.

5. The display unit according to claim 4, wherein the distance L between the display face of the image displaying means and the prescribed point, the size D of the display face, the focus length f of the fine optical element, and the size W of the aperture satisfies the relation:

$$W \leq f \times D/L.$$

6. The display unit according to claim 4, wherein the barrier means is capable of switching a transmission mode to an aperture formation mode to allow the light of the surface light source to pass through the apertures, or to an entire transmission mode, by switching.

7. The display unit according to claim 4, wherein the barrier means is a liquid crystal panel element.

8. The display unit according to claim 6, further comprising a hard switch for switching the transmission mode of the barrier means.

9. The display unit according to claim 6, further comprising a sensor for detecting the approach of the face of an observer to the display face of the image display means, wherein the transmission mode of the barrier means is switched in accordance with the detection output of the sensor.

10. The display unit according to claim 6, further comprising means for switching inter-connectedly the transmission mode of the barrier means and a displayed content of the image display means inter-connectedly.

11. The display unit according to claim 6, further comprising means of switching a displayed content of the image display means, and means of switching the transmission mode of the barrier means.

12. A display method, employing the display unit according to claim 6, comprising the steps of:

enabling monocular observation of magnified displayed information from the prescribed point or vicinity thereof by switching the barrier means to the aperture formation mode to allow the light of the surface light source to pass the apertures, and enabling binocular observation of non-magnified information from a distance longer than distinct vision distance from the display face of the image display means by switching the barrier means to the entire transmission mode.

13. A display instrument, employing the display method according to claim 12.

* * * * *

UNITED STATES PATENT AND TRADEMARK OFFICE
CERTIFICATE OF CORRECTION

PATENT NO. : 6,816,313 B2
DATED : November 9, 2004
INVENTOR(S) : Koichi Hara

It is certified that error appears in the above-identified patent and that said Letters Patent is hereby corrected as shown below:

Title page,
Item [57], ABSTRACT,
Line 9, "a microlens" should read -- microlenses --; and
Line 11, "form" should read -- from --.

Column 1,
Line 56, "Moire" should read -- Moiré --.

Column 2,
Line 1, "Moire" should read -- Moiré --

Column 3,
Line 4, "a aperature" should read -- an aperture --.

Column 4,
Line 25, "turning-on of" should read -- turning on --.

Column 7,
Line 39, "Moire" should read -- Moiré --.

Column 10,
Line 24, "sort" should read -- short --;
Line 45, "independent" should read -- independent of --;
Line 51, "fairy" should read -- fairly --; and
Line 60, "pot" should be deleted.

Column 11,
Line 1, "followings:" should read -- following: --.

UNITED STATES PATENT AND TRADEMARK OFFICE
CERTIFICATE OF CORRECTION

PATENT NO. : 6,816,313 B2
DATED : November 9, 2004
INVENTOR(S) : Koichi Hara

It is certified that error appears in the above-identified patent and that said Letters Patent is hereby corrected as shown below:

Column 12,
Line 21, "shows" should read -- show an --.

Signed and Sealed this

Thirty-first Day of May, 2005

JON W. DUDAS
*Director of the United States Patent and Trademark Office*